Jan. 7, 1969  J. U. BERKL ET AL  3,420,984
RADIANT HEATER DEVICE
Filed Feb. 18, 1966
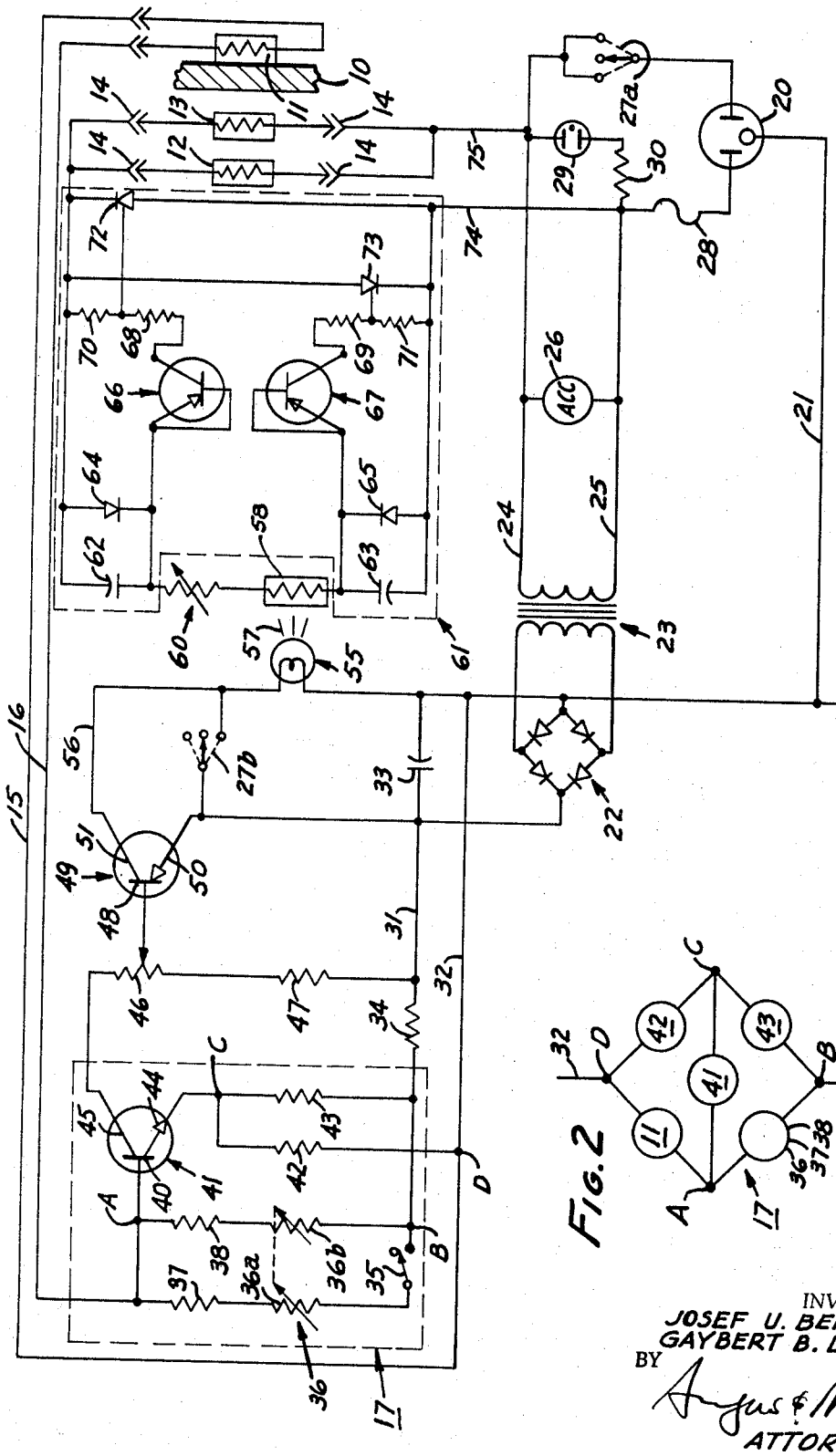
INVENTOR.
JOSEF U. BERKL
GAYBERT B. LITTLE
BY
ATTORNEYS.

United States Patent Office 3,420,984
Patented Jan. 7, 1969

3,420,984
RADIANT HEATER DEVICE
Josef U. Berkl and Gaybert B. Little, Redondo Beach,
Calif., assignors to Hi-Shear Corporation, Torrance,
Calif., a corporation of California
Filed Feb. 18, 1966, Ser. No. 528,557
U.S. Cl. 219—502                                     7 Claims
Int. Cl. H05b 1/02

This invention relates to a radiant heater.

Radiant heaters are frequently used to heat objects for various purposes, for curing as an example. One of the disadvantages in many presently known heaters is the difficulty of coordinating the heat supplied by the lamps with the heat attained at the region to be heated. It is an object of this invention to provide a rugged, simple and reliable heater which includes means for controlling heat output as a function of an actual temperature in the article being heated.

It is an additional object of the invention to provide a heater in which the temperature to be attained is readily selectable.

A heater according to this invention includes a sensor responsive to the temperature of an object to be heated, a bridge circuit responsive to the sensor output and adjustable to select a range of temperatures to be attained in the object, a transistor controlled by the output of the bridge to exert a control over a light to adjust its brilliance when the device is being controlled automatically, a light-dependent resistor receiving the luminar output of said light, and which exerts a control over a phase-type SCR power control which controls the amount of power applied to the radiant lamps.

According to a preferred but optional feature of the invention, the device can be manually adjusted by bypassing the bridge circuit and directly adjusting the said power control.

The above and other features of this invention will be fully understood from the following detailed description and the accompanying drawings in which:

FIG. 1 is a circuit drawing showing the presently preferred embodiment of the invention; and FIG. 2 is a schematic view of the bridge circuit.

The object of the invention is to heat a body 10 to some desired temperature and maintain it at that temperature during the time the body is heated. A sensor 11 comprising a thermistor whose resistance is inversely proportional to its temperature is fixed to the body such as by bonding, preferably on the shaded side thereof from one or more heating lamps 12, 13, which lamps are plugged into sockets 14 in parallel connection with each other. The sensor is connected by leads 15, 16 to provide the input to a Wheatstone bridge circuit 17. At 70° F., its resistance is 100K ohms; at 600° F., it is 100 ohms.

A receptacle 20 is adapted to be connected to a source of AC power. A ground lead 21 is grounded and connected to the receptacle and to one pole of a full-wave rectifier 22. The rectifier conveniently has a capacity of one ampere at 25 volts. It is connected to the secondary output of a transformer 23 which steps AC voltage down from about 117 volts to about 10 volts. Power leads 24, 25 are connected to the primary of the transformer and to poles of the receptacle.

Accessories 26, which may comprise a blower, for example, to blow heated air along the body surface so as to maintain it at a more uniform temperature, can be connected across the power leads.

A mode selector switch 27 has two ganged sectors, 27a 27b. The term "mode" refers to manual or to automatic operation. In the central position shown, the device is off. At the operating position shown in dotted line at the right in sector 27a and the lower in sector 27b, the device will operate under manual control. At the other dotted line position, it will be in automatic operation. A fuse 28 (10 amp) and an indicator lamp 29 such as an NE2H are also provided. A resistor 30 is in series with the lamp, having a value of 33K, these two being connected across the power leads.

The bridge circuit 17 has four junction points indicated by letters A, B, C. D in FIGS. 1 and 2, for convenience. Rectified DC power is supplied to the bridge through leads 31, 32. A capacitor 33 having a value of 100 µf. is connected between lead 31 and the ground line. A resistor 34 having a value of 1000 ohms is connected in series in lead 31. A range selector switch 35 is connected to lead 31. This is a single pole, single throw switch with two positions.

A two-sector variable resistor 36 has a pair of ganged sectors 36a 36b. Sector 36a conveniently has a maximum resistance of 1000 ohms and sector 36b of 25K ohms. Resistors 37, 38 are in series with sectors 36a and 36b, respectively, and have respective values of 82 ohms and 820 ohms. The parallel circuitry of the variable resistor (sometimes called an adjustment means) is connected to point A. Point A is connected to base 40 of a transistor 41 which constitutes the output of the bridge circuit.

Transistor 41 is an NPN type such as a 2N1306. This transistor does not have a sharp on and off point. Instead, there is between its on and off point a proportional band width. Accordingly, a band of temperatures can be selected such as a 3° temperature band. The device will be full on or full off on either side of the band with a proportional output within the band, referred, of course, to the sensor condition and the setting of resistor 36. The selection of the band value itself is made by setting the variable resistor 36 and the range selector switch.

A pair of reference resistors 42, 43 having resistance of 270 ohms form the remainder of the bridge circuit. Both are connected to point C and one each is connected to points D and B, respectively. Reference to FIG. 2 will now indicate that any imbalance between the thermistor (sensor) and that leg or legs which includes the variable resistor or resistors will be reflected in an adjustment of the bias of transistor 41 so that a control derived from the transistor is available for control over the heating lamps. The emitter 44 of transistor 41 is connected to point C, and collector 45 is connected to a preset potentiometer 46 that is in series with a resistor 47 to adjust the band width. The potentiometer has a resistance of 750 ohms and resistor 47 a resistance of 270 ohms. The contact of potentiometer 46 is connected to base 48 of a transistor 49. This transistor is conveniently a 2N3611, PNP type whose emitter 50 is connected to power lead 31 and whose collector 51 is connected to one terminal of a light 55 by a lead 56. This light may conveniently be a GE #53 miniature pilot light whose luminar intensity is generally proportional to the voltage applied thereto.

Section 27b of switch 27 is connected between the emitter of transistor 49 and lead 56 so as to bypass the entire bridge circuit when the device is in manual operation. The switch is shown in FIG. 1 in the off position for the circuit.

Rays 57 indicate luminar energy being directed at an LDR 58, which is a light-dependent resistor whose resistance is inversely proportional to the luminar intensity which impinges upon it. A convenient resistor of this type is a Sigma 5HC1. This linkage between the light-dependent resistor and the light comprises a linkage between the output of the bridge circuit and a control for determining the quantum of power delivered to the heating lamps. In series with the light-dependent resistor is an adjustable resistance 60 which is used for manual control, with a maximum value of 100K ohms. These two elements LDR 58 and adjustable resistance 60, provide a signal or base source for a phase-type SCR power control 61. This power control includes a pair of opposed sectors which are symmetrical to each other so that their elements will be described in pairs. They operate on alternate segments of the AC sine wave, one being open while the other operates. This action alternates at the AC frequency. The sectors include capacitors 62, 63 whose values may conveniently be 0.47 µf., a pair of diodes 64, 65 which may conveniently be 1N4001 types, a pair of transistors 66, 67 which may conveniently be PNP types Motorola MM 1577, a pair of resistors 68, 69 having a resistance of 100 ohms, a pair of resistors 70, 71 having resistance of 470 ohms, and a pair of SCR's 72, 73 which may be Motorola types MCR1304–4. An examination of these sectors will show that the power control is symmetrical around a horizontal line in FIG. 1 and that the effect of whichever of the control elements LDR 58 or of adjustable resistance 60 is effective at the time will determine the cut-on points of transistors 66 and 67, and these in turn operate as trigger transistors to trigger the SCR's, which in turn will permit flow of current from branch 74 of power lead 25 through one or the other of the SCR's and through a return to branch 75 of power lead 24. The control is exerted by determining that proportion of the power cycle during which the SCR's are conducting. The greater the proportion of the wave during which conductance occurs, the greater the power applied to the lamps, and it is this phase-shift relationship which is determined by the LDR or by resistance 60.

The operation of the device should be evident from the foregoing. There remains to be discussed only the difference between automatic and manual operation. Assuming the device is set with sector 27b open, and sector 27a closed, the range will be determined solely by the setting of sector 36b. This determines the temperature range in which the transistor's proportional range occurs, and also determines the temperatures at which it is off and on, and thereby those object temperatures at which lamp 55 is fully on, fully off, or if the temperature is within the band, how brightly it glows. Should the temperature get too high, and be outside the preselected control range, then transistor 41 will cut off and the light will go out. Should the body be too cold and outside the range, then the light will burn fully bright. Should it be within the range, then the glow will be proportioned. Should the range be desired to be outside one which can be determined solely by sector 36b, then switch 35 is closed, and the bias result will be determined as a function of both segments 36a and 36b. The selector may be calibrated as desired.

The luminar output of lamp 55 will have its effect on LDR 58, adjustable resistance 60 being placed in a predetermined condition during automatic operation. The power control will function as heretofore described under basic control of the sensor.

For manual operation, both sectors 27a and 27b are closed, the latter bypassing the bridge circuit and causing lamp 55 to burn at full brightness irrespective of the condition of body 10. Then there will be no variation in the resistance of LDR 58, and temperature adjustment it attained by adjusting resistance 60 which now governs control 61.

This device thereby provides a simple, rugged and quite accurate control which can be operated both automatically and manually.

This invention is not to be limited by the embodiments shown in the drawings and described in the description which are given by way of example and not of limitation, but only in accordance with the scope of the appended claims.

What is claimed is:
1. A heater comprising: an electric heating lamp; a sensor having a resistance which is a function of its temperature; a bridge circuit including the sensor; a first transistor connected to said bridge circuit whose bias is responsive to bridge balance and imbalance; a second transistor controlled by said first transistor; a second lamp of the class which produces luminar energy as a function of voltage applied thereto; said second lamp being connected in series with said second transistor to a source of electrical energy, the energy level being determined by said second transistor as a function of the condition of the first transistor; a light-dependent resistor positioned so as to be responsive to luminar energy from said second lamp, the resistance of said light-dependent resistor being a function of the luminar intensity impinging thereon; an adjustable resistance in series connection with said light-dependent resistor; a phase-type SCR power control connected to said adjustable resistance and light-dependent resistor, and including a pair of oppositely disposed silicon controlled rectifiers in parallel connection with each other in a power circuit to the said heating lamp; and a mode selector switch so disposed and arranged as to be adapted selectively to provide maximum power to said adjustable resistance thereby to bypass control of the sensor and bridge, whereby intensity of the illumination of the second lamp determines what portion, if any, of an AC power wave will be transmitted by the SCR's to the heating lamp, thereby to control the heat delivered thereby when the mode selector switch does not bypass the sensor and bridge, and whereby heat delivered is controlled by the adjustable resistance when the mode selector switch bypasses the sensor and bridge.

2. A heater according to claim 1 in which the bridge circuit comprises a pair of reference resistors, the sensor, and a variable resistor, connected as four legs, with the base and emitter of the first transistor connected to the junction of the sensor and the variable resistor, and to the junction of the reference resistors, respectively.

3. A heater according to claim 2 in which the variable resistor includes two sectors in parallel connection with each other, and in which one of said sectors includes a single throw slingle pole switch adapted to join or to separate the sectors.

4. A heater according to claim 2 in which the base of the second transistor is connected to the collector of the first transistor.

5. A heater according to claim 4 in which a potentiometer is connected between the base of the second transistor and the collector of the first transistor.

6. A heater according to claim 5 in which the phase-type SCR power control includes a pair of oppositely disposed diodes, and a pair of oppositely disposed trigger transistors, said trigger transistors being connected to the SCR's so as to control the same.

7. A heater according to claim 6 in which the diodes are connected to the bases of the trigger transistors, in parallel with respective capacitors, and in which the collectors of the trigger transistors are connected to respective ones of said SCR's.

References Cited

UNITED STATES PATENTS

| | | | |
|---|---|---|---|
| 3,200,329 | 8/1965 | Haisty | 323—21 |
| 3,311,813 | 3/1967 | Sutcliffe | 323—21 |

BERNARD A. GILHEANY, *Primary Examiner.*

FRED E. BELL, *Assistant Examiner.*